United States Patent
Harmand et al.

[19]

[11] Patent Number: 6,113,322
[45] Date of Patent: Sep. 5, 2000

[54] CYLINDER HEAD CLAMPING FIXTURE

[75] Inventors: Brice Harmand, San Diego, Calif.;
Pierre Harmand, Annecy, France

[73] Assignee: Harmand Family Limited Partnership, San Diego, Calif.

[21] Appl. No.: 09/153,765

[22] Filed: Sep. 15, 1998

Related U.S. Application Data

[60] Provisional application No. 60/087,242, May 29, 1998.

[51] Int. Cl.[7] .............................. B23B 35/00; B23B 41/12
[52] U.S. Cl. .......................... 409/132; 409/224; 409/227
[58] Field of Search ..................................... 409/219, 224, 409/227, 132, 131; 269/79, 76, 296

[56] References Cited

U.S. PATENT DOCUMENTS

| | | |
|---|---|---|
| 3,782,847 | 1/1974 | Kulzer . |
| 4,140,306 | 2/1979 | Wheeler . |
| 4,145,006 | 3/1979 | Webb . |
| 4,168,826 | 9/1979 | Rottler ...................................... 269/73 |
| 4,382,589 | 5/1983 | Cammi ...................................... 269/50 |
| 4,414,723 | 11/1983 | Kammeraad et al. . |
| 4,416,570 | 11/1983 | Argenbright .............................. 409/224 |
| 4,417,376 | 11/1983 | Kammeraad et al. ................... 409/224 |
| 4,657,446 | 4/1987 | Flaten ......................................... 408/87 |
| 5,281,057 | 1/1994 | Ritt . |
| 5,338,015 | 8/1994 | Leigel et al. ............................... 269/71 |
| 5,575,488 | 11/1996 | Sholly, Jr. ............................... 409/219 |
| 5,655,278 | 8/1997 | Harmand ................................. 409/227 |
| 5,692,734 | 12/1997 | Aldredge, Sr. .......................... 269/166 |
| 5,732,937 | 3/1998 | Morghen ................................... 269/47 |
| 5,741,111 | 4/1998 | Goostrey . |
| 5,759,140 | 6/1998 | Egbert ..................................... 409/224 |

FOREIGN PATENT DOCUMENTS

| | | |
|---|---|---|
| 0300959 | 1/1989 | European Pat. Off. . |
| 7-328863 | 12/1995 | Japan . |
| WO 92/04152 | 3/1992 | WIPO . |

*Primary Examiner*—Daniel W. Howell
*Attorney, Agent, or Firm*—Brown, Martin Haller & McClain

[57] ABSTRACT

A universal roll-over cylinder head clamping fixture utilizes columns to support a first and a second pillow block. Each pillow block has a spherical recess that accepts a spherical joint. Spherical joints are positioned on extensions of a device that fastens to and/or supports a first end and a second end of a cylinder head. Each column of the fixture is free to move up or down independently form any other column of the clamping system. The spherical joint and independently operated columns provide a cylinder head clamping fixture that provides rotation and tilting of a cylinder head to any desired position.

32 Claims, 6 Drawing Sheets

CYLINDER HEAD CLAMPING FIXTURE

This application claims priority under 35 U.S.C. §119(e) to U.S. Provisional Application Ser. No. 60/087,242, filed May 29, 1998.

BACKGROUND OF THE INVENTION

The present invention relates generally to a device for securing an engine cylinder head for the process of machining the valve seats of the cylinder head, and more specifically to a universal roll-over cylinder head clamping fixture that is rotatable, tiltable, and that provides a means for palletizing the preparation process of a cylinder head.

The machining of the valve seats in a cylinder head requires securing the cylinder head in a position below a machining apparatus. Valve seat bore guides of a cylinder head may be angled in a variety of directions. Thus, to align the machining tool with a valve seat bore guide, either the machining tool must be capable of angular and height adjustment or the cylinder head must be positioned into alignment by utilizing an adjustable cylinder head holder. Cylinder head holders that are known in the art offer limited maneuverability of the cylinder head. A typical prior art cylinder head holder may provide limited rotation of the cylinder head. Vertical or height positioning of the cylinder head require manual adjustments of the holding apparatus that is often cumbersome and time consuming. Further, these systems do not have the capability of convenient and quick means for tilting the cylinder head lengthwise or sideways.

Correct alignment of the valve seat boring guide is not often achieved on a first attempt at alignment. Prior art cylinder head holders are not designed to provide mechanisms for fine adjustments. Thus, if proper alignment is not achieved, the holder hardware must be manually released to provide a new gross adjustment that approximates proper alignment. The operator must then rely on the machining tool to provide precise alignment. Machining tools that do not have fine adjustment capability must rely on the alignment mechanism of the cylinder head holder.

A machine shop often has a number of cylinder heads that are in line to be machines. Prior art cylinder head holding systems require a serial process of placing a cylinder head into a holder, adjusting the cylinder head if possible, machining the cylinder head, and removing the cylinder head from the holder. The prior art does not provide a means to speed up this process whereby any number of cylinder heads may be prepared for machining apart from the holding apparatus while another cylinder head is being machined.

Cylinder head holders of the prior art do not provide a convenient and quick means for adjusting rotational angle, vertical height, lengthwise tilt, and sideways tilt of the cylinder head. In addition, the prior art does not provide a method for palletizing cylinder heads for machining. With these deficiencies in the art, it is desirable to provide a cylinder head clamping fixture that provides rotational and height and tilt adjustment capabilities. It is also desirable to provide a means for preparing a cylinder head for quick insertion into a clamping fixture.

SUMMARY OF THE INVENTION

It is an advantage of the present invention to provide a cylinder head support that allows for the full rotation, i.e. 360 degrees, of a cylinder head whereby the cylinder head may be rotated to a specified angle and locked into position.

It is another advantage to provide a cylinder head support that vertically adjusts the height of the cylinder head.

It is yet another advantage to provide a support having a means for tilting the cylinder head sideways or for tilting a single corner of the cylinder head.

It is a further advantage to provide a cylinder head support system that enables "palletization" of cylinder heads.

The clamping fixture of the exemplary embodiment is movable on the work surface of a machining apparatus and supports a cylinder head at a position below a machining tool of the machining apparatus. The clamping fixture includes two vertical supports for supporting opposing ends of a cylinder head such that the cylinder head is disposed and suspended between the first and second vertical supports. The first and second vertical supports may be independently or cooperatively operated. Simultaneous operation of the vertical supports provides a uniform, i.e. substantially horizontal, raising or lowering of the cylinder head. Raising or lowering one of either the first vertical support or the second vertical support provides lengthwise tilting of the cylinder head.

The first vertical support accepts an extension of a first fastening device that is attachable to a first end of a cylinder head and a second vertical support accepts an extension of the second fastening device that is attachable to a second end of a cylinder head. The first and second fastening devices may be part of a single fastening unit or may be separate or separable devices. In the exemplary embodiment, the extensions of the first and second fastening devices, or cylinder head support brackets, are cylindrical arbors. The cylinder head and fastening devices form a palletable unit that may be prepared apart from the clamping fixture and later transferred to the clamping fixture as required. Thus, one or more additional cylinder heads may be "palletized", i.e. prepared for use and quick insertion into the clamping fixture, while the machining device is being utilized for machining the valve seats of another cylinder head.

Each of the first and second vertical supports has a clamp block comprising an upper clamping block and a lower clamping block. An arbor opening is formed in a recessed portion of the upper clamping block and a corresponding recessed portion of the lower clamping block such that when the upper and lower clamping blocks are mated, the recessed portions form the arbor opening for accepting an arbor of the head support bracket.

The upper and lower clamping blocks are openable to allow the placement of the arbors of the palletable unit onto the recessed portions of the lower clamping blocks. In the exemplary embodiment, the upper and lower clamping blocks are hingedly attached such that the upper clamping block pivots open on a clamp pivot. A locking mechanism such as a lever or cam assembly acts to securely lock the arbor of the fastening device between the upper clamping block and the lower clamping block. It is not necessary to have the upper and lower clamping clocks hingedly attached. For example, in an alternate embodiment, the upper and lower clamping blocks are vertically separable to allow the arbors of the head support brackets to be placed on the lower clamping blocks.

The present invention utilizes cylindrical arbors that are 360 degrees rotatable in the arbor opening between the upper and lower clamping blocks. Once the cylinder head is rotated to a desired rotational position, the locking mechanism locks the arbors of the fastening devices into place by tightly sandwiching the arbors between the upper and lower clamping blocks. The locking mechanism may be mechanical, hydraulic, pneumatic, or electric.

In the exemplary embodiment, a clamp band is placed on each arbor at the position of the arbor opening such that the upper and lower clamping blocks close around each clamp band which, in turn, tightly press around the arbor when the locking mechanism is engaged. The clamp bands, which are utilized to prevent the arbors from slipping and rotating out of the desired rotational position, are spherically shaped joints that are notched to allow the band to radially collapse to a smaller diameter when pressure is applied to the outside of the bands. Once the pressure is released, the clamp band expands to its original diameter. The band may be formed from any material, such as a ferrous alloy, which is sufficiently resilient to ensure that the clamp bands expands to its original shape once pressure is released.

The clamp blocks of each of the vertical supports are vertically adjustable so that the cylinder head may be raised and lowered to a desired vertical height. The vertical adjustment of each clamp block is independently operable so that the cylinder head may be tilted lengthwise. In the exemplary embodiment, each clamp block is supported on two columns comprising a first column that is positioned nearest to an operator of the machining apparatus, and a second column positioned adjacent the first column. Each column may be raised or lowered independently from any other column in the clamping fixture to tilt the cylinder head in any direction. Thus, the cylinder head may be raised or lowered in a plane horizontal to the work surface, tilted lengthwise, or tilted sideways. A sideways tilt capability provides fine adjustment of the rotational angle of the cylinder head. This embodiment also allows one corner portion of the cylinder head to be raised or lowered.

In the exemplary embodiment, a pair of gas struts are attached in both the first vertical support and the second vertical support from the clamp block to the support base. The gas struts provide a constant upward bias on the clamp blocks. To adjust the vertical position of the cylinder head, downward pressure is applied to the cylinder head or to the upper surfaces of the clamp block that causes the clamp lock to be lowered as the columns are lowered. Pressure applied to an end of the cylinder head or to a single clamp block will lower the columns adjacent the downward pressure. Similarly, pressure applied to the middle of the cylinder head will lower the entire cylinder head uniformly. Once the desired vertical adjustments of the cylinder head are complete, a locking assembly is activated to lock the columns at the desired position. The cylinder head can be re-positioned by releasing the locking assembly and applying downward pressure to the cylinder head. The exemplary embodiment of the invention utilizes a pneumatically-controlled column locking mechanism. In alternate embodiments, the column locking mechanism may be mechanical, hydraulic, magnetic, electric, or any other locking mechanism that is known in the art.

BRIEF DESCRIPTION OF THE DRAWINGS

Understanding of the present invention will be facilitated by consideration of the following detailed description of a preferred embodiment, taken in conjunction with the accompanying drawings, in which like reference numerals refer to like parts, and in which:

FIGS. 5a, 5b, and 5c illustrate the lengthwise tilting of the cylinder head seated in a clamping fixture, where

DESCRIPTION OF THE PREFERRED EMBODIMENTS

The clamping fixture of the preferred embodiment may be used in conjunction with a cylinder head machining tool, but may also be used for supporting any type of workpiece. The clamping fixture includes two support structures that are horizontally movable on a work surface and that are used to suspend a cylinder head below the machining tool. The clamping fixture provides means to tilt, raise and lower, and rotate the cylinder head to facilitate the aligning of any valve guide in a cylinder head to the machining tool axis.

Figure 1:
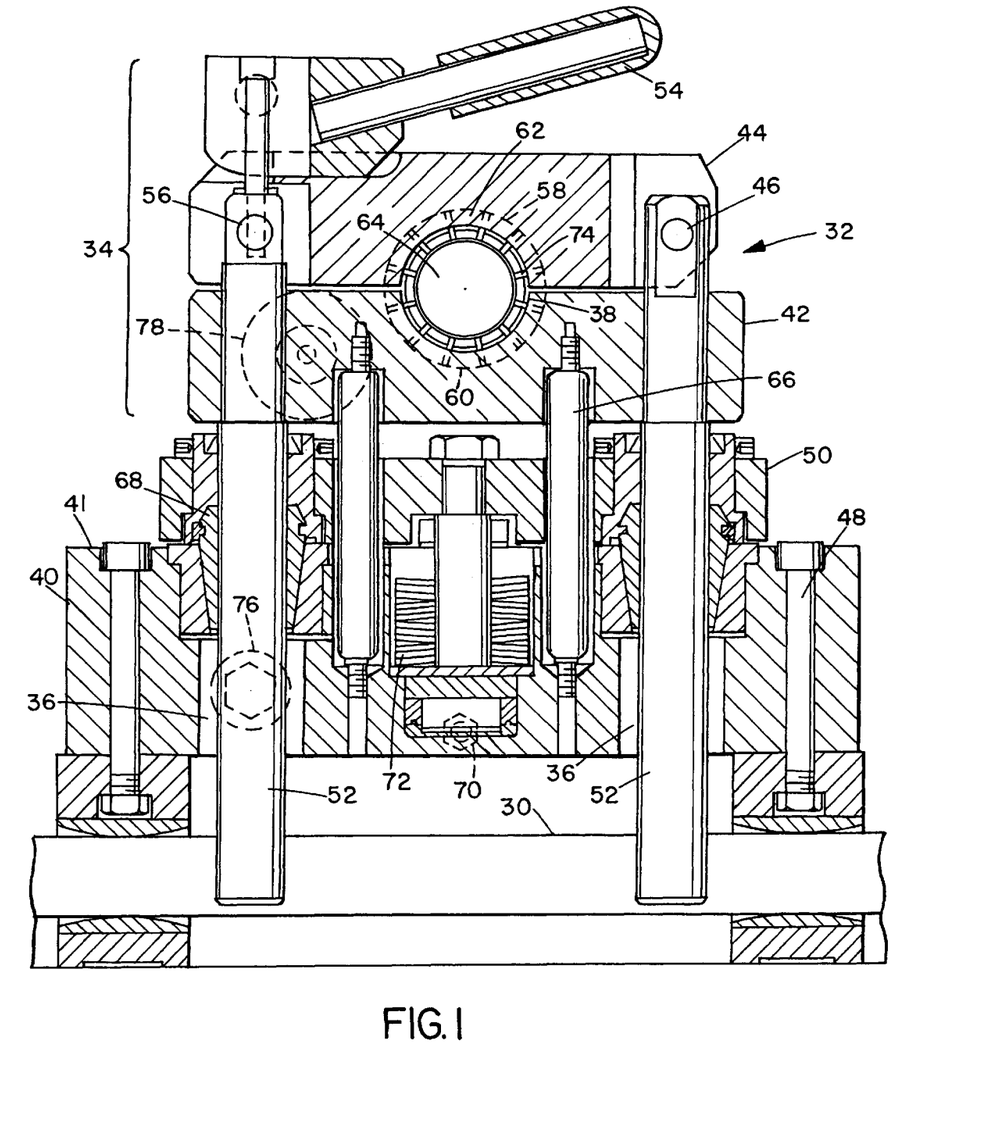
FIG. 1 is a side view of a clamping fixture of the preferred embodiment.

FIG. 1 illustrates a side view of one of two support structures 32 of the clamping fixture of the preferred embodiment. The base 40 of the support structure 32 is seated on the work surface 30 of the machining tool. The work surface 30 is illustrated in FIG. 1 as parallel rails, but may also be any surface that provides means for mounting a support structure 32. Rails facilitate movement of a cylinder head and clamping fixture in a horizontal plane below the machining tool. The support structure 32 may be fastened to the work surface 30 by the use of rail locking screws 48 or other suitable means to prevent the support structure 32 from moving.

Each support structure 32 has a base assembly 40, columns 52, and a clamp assembly 34. As shown in FIG. 1, the base assembly 40 of the preferred embodiment rests upon the work surface 30 and includes the rail locking screws 48. Column channels 36 extend through the base assembly 40 and are sized to accept a first and second column 52. The preferred embodiment includes two parallel columns 52, however, alternate embodiments may have a single column or more than two columns. For example, a first alternate embodiment may have a single column that moves vertically in a single base channel. A clamp block of this alternate embodiment may be rigidly or pivotably attached to the single column allowing front and backwards tilt of the cylinder head.

Continuing with a description of the preferred embodiment of FIG. 1, the columns 52 are attached to the clamp assembly 34 so that an upward or downward movement of the columns 52 will similarly move the clamp assembly 34 upwardly or downwardly. The clamp assembly 34 includes an upper block 44 hingedly attached to a lower block 42 at a clamp pivot point 46. In other embodiments, the upper and lower blocks may be vertically separable along extensions of the columns, or one or both of the blocks may be detachable form the clamp block. However, the hinging of the upper block 44 from the lower block 42 of preferred embodiment provides an unobstructed access to a spherical recessed area 60 of the lower block 42. The upper block 44 and lower block 42 of the preferred embodiment have spherical recessed areas 58, 60 which form a spherical opening 38 when the upper block 44 is hinged closed upon the lower block 42. The spherical opening 38 provides a seat for a spherical spring collet 62, also referred to herein as a clamp band. The spherical spring collet 62 fits onto the arbor 64 of a fastening device that is attachable to an end of a cylinder head.

Figure 3:
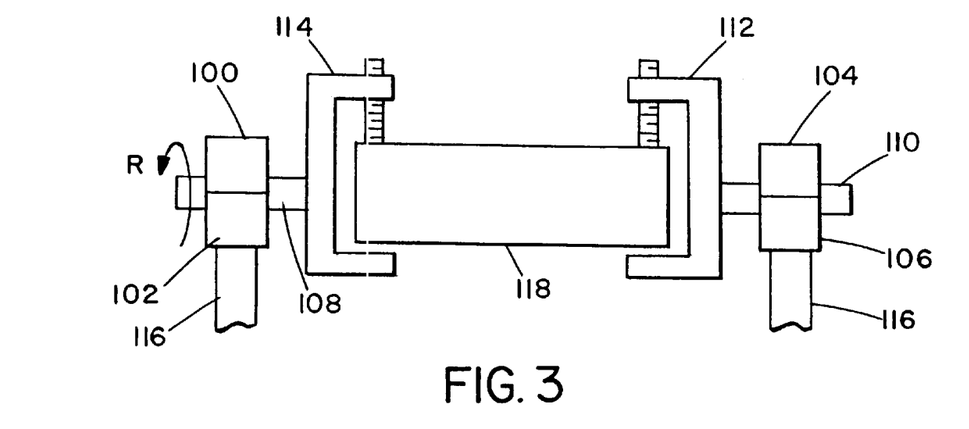
FIG. 3 is a front view of a cylinder head supported by a fastening device that is seated in a clamping fixture.

The manner in which a cylinder head is held in a position by a support structures 32 is illustrated in FIG. 3. A first fastening device 114 and a second fastening device 112 are attached to opposing ends of a cylinder head 118. The fastening devices 112, 114 include arbors 110, 108 that extend outward from the fastening devices 112, 114. The arbors 110, 108 are seated in pillow blocks consisting of upper pillow blocks 100, 104 and lower pillow blocks 102, 106 attached to columns 116. The arbor of FIG. 3 is freely rotatable as indicated by R, i.e. 360 degrees, in a clockwise or counterclockwise direction when the pillow blocks are not tightened around the arbor. Once the cylinder head 118 is rotated and/or tilted to a desired position, upper blocks 100, 104 are clamped and locked to lower blocks 102, 106 thereby clamping the arbors 108, 110 in place.

Figure 4:
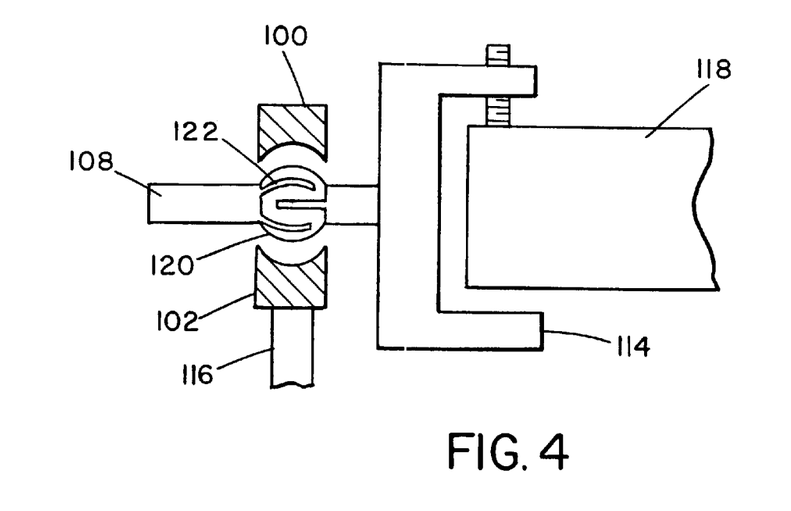
FIG. 4 illustrates a spherical clamp band positioned in a spherical clamping fixture.

A tight grip of the arbors 108, 110 to prevent slippage is accomplished by utilizing a spherical spring collet 120 that may be seated into a spherical recess of the pillow block as shown in FIG. 4. The spherical spring collet 120 is a sphere-shaped collet that fits onto the arbor 108 and may be formed as a spherical shell with opposing arbor openings or as a sphere with a channel. Either embodiment of the spherical spring collet 120 includes slits 122 that alternately extend from one arbor opening towards, but stopping short of, the opposing arbor opening. The slits 122 allow the spherical spring collet 120 to contract, and thereby tighten upon the arbor 108 when the upper block 100 is mated and locked to the lower block 102. The number of alternating slits 122 may vary according to the size of the spherical spring collet 120 and/or the resilience of the material that forms the collet 120.

Referring back to FIG. 1, to provide a radially contracting inward pressure upon the spherical spring collet 62 that will force slits 74 to close inward, the spherical spring collet 62 must be slightly larger in diameter than the inside diameter of the spherical opening 38 that is formed when the spherical recessed area of the upper block 44 is mated to the spherical recessed area 60 of the lower block 42. In addition, the upper block 44 must be locked in place to the lower block 42 by a locking mechanism 54. The preferred embodiment utilizes a lever locking mechanism 54 that provides a locking pressure that forces the upper block 44 towards the lower block 42. The locking mechanism 54 pivots on a locking mechanism pivot 56 to release the spherical spring collet 62 from a contracted state and to allow the upper block 44 to hinge open from the lower block 42 on clamp pivot 46. Other embodiments may utilize variations of the mechanical clamp locks as illustrated by the locking mechanism 14 in FIG. 6. The upper and lower blocks 44, 42 may also utilize pneumatic, hydraulic, or electrical locking assemblies.

The spherical spring collet 62 of the preferred embodiment is shown to accept a cylindrical arbor 64. However, other embodiments may utilize non-cylindrical arbors where the spherical spring collet channels or openings are formed to match the shape of the arbor. As shown in FIGS. 3 and 4, rotation of the cylinder head 118 is facilitated by the spherical spring collet 120 rather than by the shape of the arbor 108.

Figure 5A:
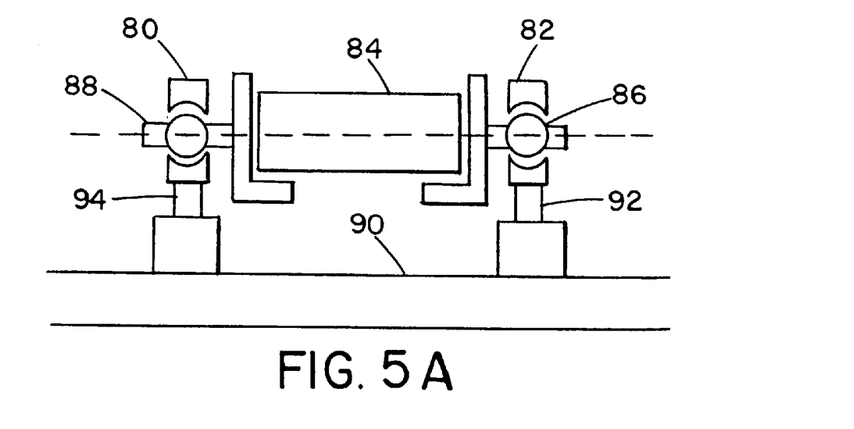
FIG. 5a shows the cylinder head positioned in a substantially horizontal plane.
Figure 5B:
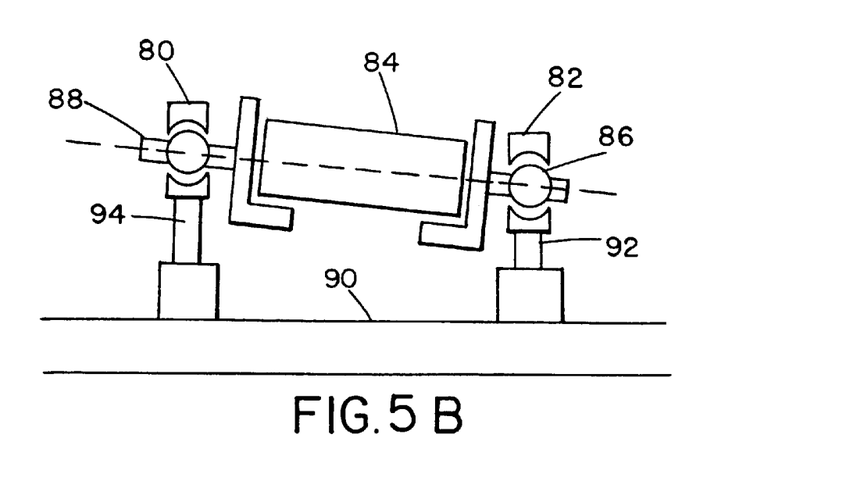
FIG. 5b shows the cylinder head tilted at a first end.
Figure 5C:
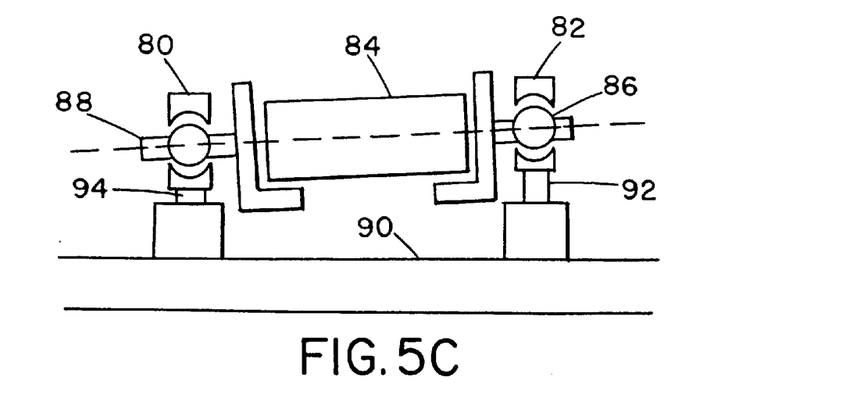
FIG. 5c shows the cylinder head tilted at a second end.

FIGS. 5a through 5c illustrate the further advantages of a spherical spring collet. In addition to providing a point of rotation and a clamping pressure to hold arbors 88 in a desired rotational position, spherical spring collets 86 also allow a cylinder head 84 to be tilted lengthwise. FIG. 5a illustrates a cylinder head 84 suspended between pillow blocks 80 and 82. Columns 94 and 92 are equally extended to maintain the cylinder head 84 in a plane that is parallel to work surface 90. In FIG. 5b, column 94 is extended upward to lift a first end of the cylinder head 84. As the column is raised, the spherical spring collets 86 turn within the spherical openings of the pillow blocks 80, 82. Once the desired rotation and tilt of the cylinder head 84 is realized, the pillow blocks 80, 82 and columns 92, 94 are locked into place by locking mechanisms. FIG. 5c illustrates column 94 in a nearly un-extended position that causes a second end of the cylinder head 84 to be raised above the first end. In the preferred embodiment of the present invention, the columns 94 and 92 can be raised or lowered simultaneously or separately.

In the preferred embodiment, FIGS. 5a–5c illustrate the forward columns 94, 92 of a two column support structure with the second columns hidden from view behind the forward columns 94, 92. FIGS. 5a–5c may also be considered to illustrate a side view of an second embodiment that includes singular column support structures 94, 92.

Referring once again to FIG. 1, columns 52 of the support structure 32 may extend upward to an extended height that is determined by the column length and the extension limit of the upward biasing component(s) of the structure 32. FIG. 1 illustrates the columns 52 in an unextended position. The upward biasing components of the preferred embodiment are gas struts 66. When the columns 52 are in an unlocked state, the gas struts 66 will lift the pillow block 34 and the corresponding end of the supported cylinder head to a full extension which is dependent upon the length of the extended gas strut 66. The cylinder head is lowered by exerting a downward pressure on the cylinder head. The downward pressure overcomes the upward bias of the gas struts 66 and causes the columns 52 to slide downward into the column channels 36.

When the cylinder head has been positioned at a desired height, the columns 52 are locked into place utilizing a column locking mechanism thereby locking and preserving the desired cylinder head height. The height may be adjusted by releasing the column locking mechanism, thus allowing the upward bias to exert an upward force. The operator then reapplies a downward pressure by pushing down on the cylinder head until the alternate desired height is achieved.

The column locking mechanism of the preferred embodiment is illustrated in FIG. 1. Spring collets 68 are position concentrically with the column channels 36 and adjacent a top surface 41 of the base assembly 40. Collet plate 50 squeezes and presses the collets 68 into the columns 52 thereby locking the columns 52 into a desired position. The locked position of the preferred embodiment is the normal, or "at rest," state of the clamping fixture. To release the columns 52 from the locked position, air is introduced into air inlet 70 to activate piston 72. Piston 72 lifts the collet plate 50 allowing the spring collets 68 to expand and release the columns 52. To re-lock the columns 52, air pressure into the piston 72 is removed and the collet plate 50 lowers and re-exerts an inward pressure on the spring collets 68 which then hold the columns 52 at their desired height position.

In alternate embodiments of the present invention the collet plate 50 may be lifted to release the columns 52 by hydraulics, electrical or mechanical assemblies, or a variation of the above described pneumatic system. Also, it is not necessary to use a spring collet-based locking system. For example, the columns may be locked by a gearing system or by any equivalent mechanical, hydraulic, pneumatic, or electrical system which can be configured to lock and release the columns 52.

Figure 2:
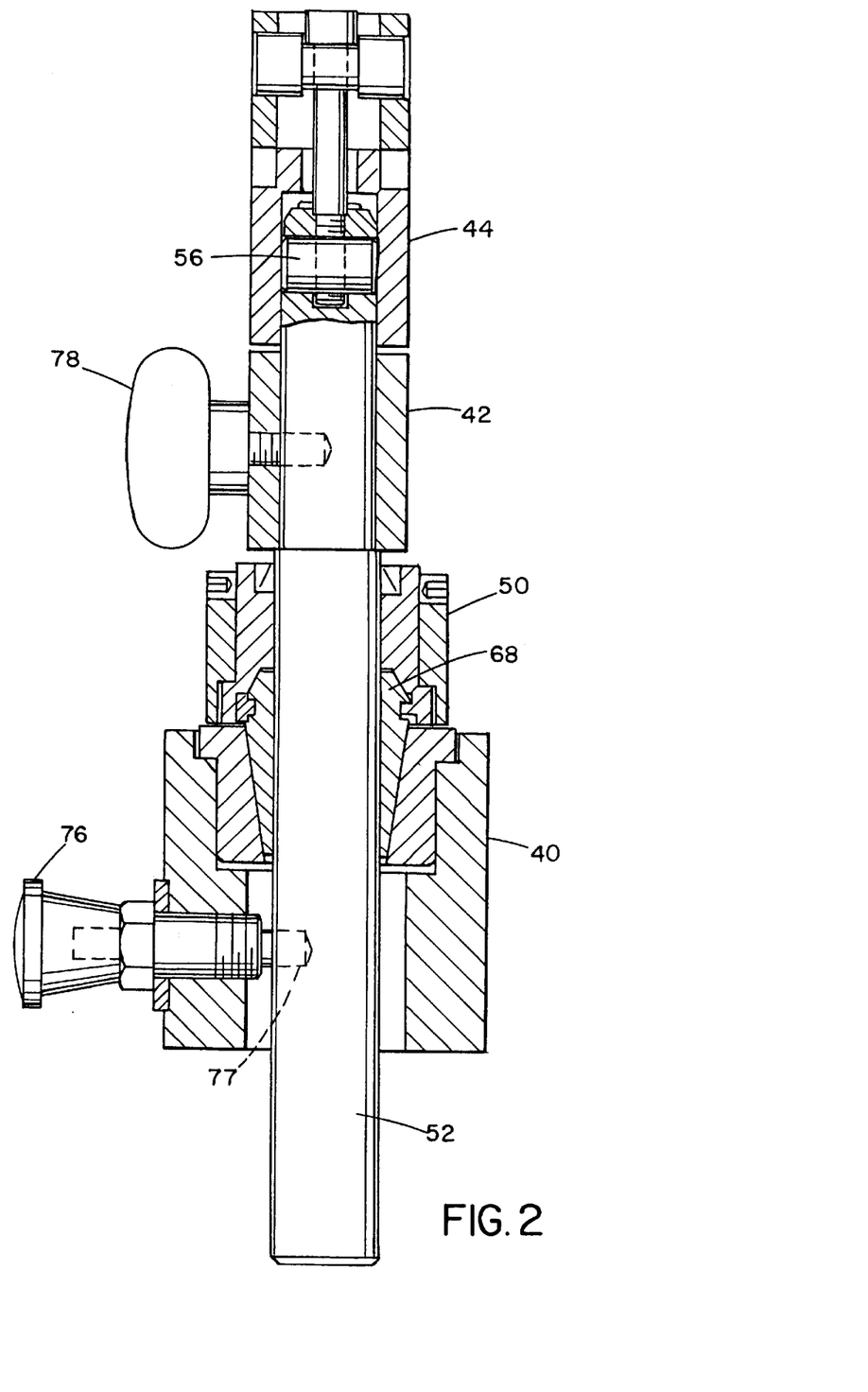
FIG. 2 illustrates a cross section of a column of the clamping fixture of FIG. 1.

As shown in FIGS. 5a–5c, the engine cylinder head 84 may be tilted lengthwise. Tilting the cylinder head requires independent operation of the columns 94 and 92. In the preferred embodiment illustrated in FIG. 1, the pneumatic system controls the pistons 72 of the first and second support structures 32 that support the opposing ends of the cylinder head. To prevent the columns 68 of a support structure 32 from lifting when the collet plate is lifted, a stop pin 76 as shown in FIG. 1 may be utilized. FIG. 2 illustrates a cross section of a column 52 of the clamping fixture. Stop pin 76 extends from the base 40 and may be pulled outward to release the stop pin 76 from a column recess 77. The column recess 77 aligns with the stop pin 76 when the column 52 is in an un-extended position. Thus, when the pneumatic assembly lifts the collet plates 50 of the first and second support structures 32, the upward bias of the gas struts 66 cannot lift the pillow blocks 34 unless the stop pins 76 have been released. A lengthwise tilt of the cylinder head as shown in FIGS. 5a–5c can be accomplished by releasing a single stop pin 76 of either the first or second support structures 32.

Figure 8:
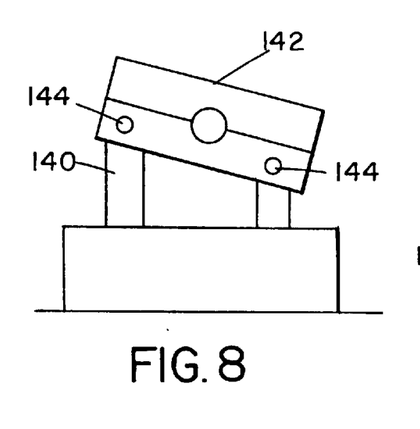
FIG. 8 is a side view of an alternate embodiment of a support structure having a pivotable clamping block.

In an alternative embodiment of a support structure as shown in FIG. 8, columns 140 are pivotally attached to the pillow block 142 at pivotal attachment points 144 to allow independent operation of the columns 140. A single corner of the cylinder head can be lowered to provide a lengthwise and sideways tilt of the cylinder head after the desired rotational angle has been chosen. Downward pressure in one corner of the cylinder head or pillow block 142 will cause a column 140 nearest the pressure to lower. The embodiment with sideways tilt provides a fine adjustment of the rotational angle once the arbors have been locked into position by a clamping block locking mechanism.

An optional clamping fixture handle 78 is illustrated in FIG. 1 and in FIG. 2 of the preferred embodiment. The handle 78 allows an operator to grip each support structure 32 for a number of purposes including for moving the clamping fixture horizontally on the work surface 30. In other embodiments, horizontal movement of the clamping fixture may be facilitated by an mechanical, electrical, pneumatic, or hydraulic moving mechanism that is integral to the work surface.

Figure 6:
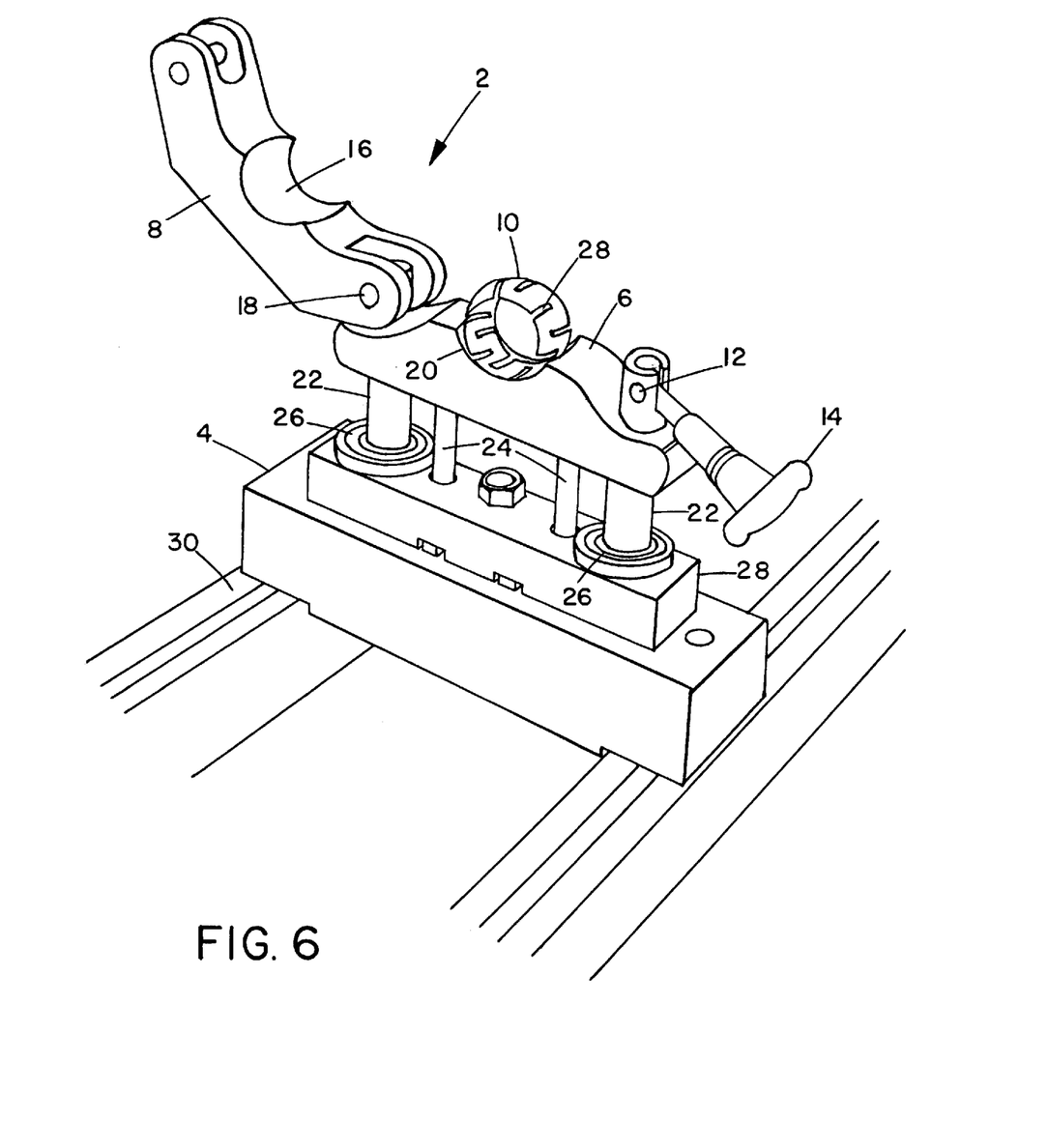
FIG. 6 is a perspective view of a clamping fixture of an alternate embodiment.

FIG. 6 is a perspective drawing of an alternate embodiment of a support structure 2. A base 4 is seated on parallel rails of a work surface 30 of a machining apparatus. Columns 22 may be raised and lowered into column channels 26 in the base 4 when a locking mechanism assembly 28 is lifted off of the base 4 to release the columns 22 from a locked position. A pillow block assembly is attached to columns 22 and consists of an upper block 8 that is hingedly connected at a hinge point 18 to a lower block 6. Upper and lower blocks 8, 6 include spherical recessed areas 16, 20 that form a spherical opening when the upper and lower blocks 8, 6 are hinged into a closed position. The spherical opening accepts a clamp band 10 that may be sized to be minimally larger that the spherical opening. Thus, when clamp lock 14 is pivoted about the locking pivot 12 to lock the upper block 8 to the lower block 6, the pressure exerted on the outside of the clamp band 10 causes the clamp band slits 28 to narrow thereby contracting the clamp band 10. The contraction of the clamp band 10 holds an arbor (not shown) at a desired rotational angle. An upward bias assembly 24 lifts the pillow block when the locking mechanism assembly 28 releases the columns 22 from a locked position.

Figure 7:
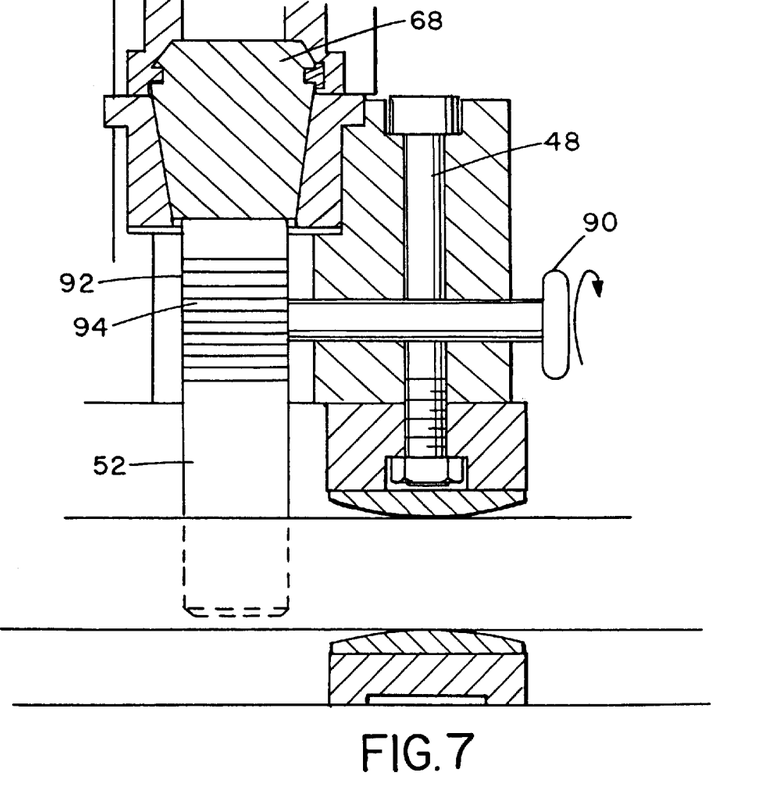
FIG. 7 is a side view illustrating a mechanical means of lowering at least one column of the clamping fixture.

FIG. 7 illustrates a side view of a mechanical means for lowering at least one column 52 of the clamping fixture. The upward bias of the support structure may be difficult to overcome when a workpiece is not supported on the clamping assembly. Therefore, an alternative means to lower a column 52 may be desirable. FIG. 7 illustrates an exemplary means that utilizes a mechanical gearing assembly. An operator wheel 90 rotates gear wheel 94 that interacts with rack gear 92 to lower column 52. The rack gear 92 may be machined onto or attached to the outside of column 52. The mechanical gearing assembly illustrated in FIG. 7 is a downward bias mechanism. A downward bias may also be accomplished by other systems which are known in the art, including electrical, pneumatic, or hydraulic systems.

Figure 9:
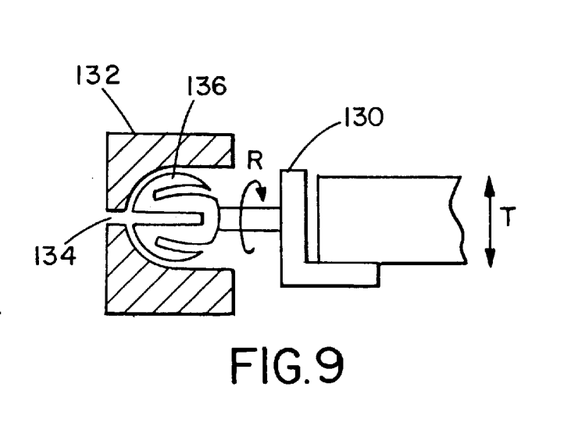
FIG. 9 illustrates another embodiment of a spherical spring collet.

The present invention uses a spherical joint/ball positioned inside a spherical pillow block that is attached to a vertically slidable column. The spherical ball/joint provides the clamping fixture with a capability to rotate and tilt an attached cylinder head. Whether the pillow block has a clam shell-like opening, or whether the spherical joint is integral to or separate from the pillow block or arbor is not relevant to the utility of the invention. FIG. 9 illustrates a non-split pillow block 132 that does not open to accept an arbor assembly 130. In this embodiment, the spherical spring collet 136 is integral to the pillow block and the arbor assembly 130 is slidable into the collet. A gap 134 in the pillow block 132 allows the collet 136 to expand to an unlocked state. Locking the pillow block 132 involves tightening the gap 134 and thereby contracting the collet 136. In yet another embodiment, a spherical collet is integral to the fastening device which is fastened to the cylinder head. In this embodiment, the opening of the pillow block that accepts the spherical collet need only be a partial spherical recess. Additionally, the arbor need not extend through either the collet or the pillow block.

"Palletizing" refers to a time-saving process of preparing any number of cylinder heads for machining. The present invention provides a means to prepare cylinder heads for serial insertion into a clamping fixture while the machining device is being utilized. The cylinder head and fastening devices form a palletable unit that may be prepared apart from the clamping fixture and later transferred to the clamping fixture as required.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. A device for holding a workpiece on a work surface in a first plane, said device comprising:
   a clamping fixture attachable to said work surface, said clamping fixture comprising a first support base and a second support base, each of said first and second support bases comprising:
   a base block having at least one opening;
   a column structure comprising at least one column slidably disposed in said at least one opening;
   a spring collet disposed around said at least one column for locking said at least one column at a desired position in said at least one opening, said spring collet being adapted to expand and contract around said at least one column;

a clamping block attached to said column structure, said clamping block having an arbor opening;

a locking means for locking said arbor at a rotational position; and means for adjusting a height of said clamping block and said column structure relative to said base block; and a fastening device attachable to a first end and a second end of said workpiece, said fastening device having a first arbor insertable into said arbor opening of said first support base and a second arbor insertable into said arbor opening of said second support base.

2. The device for holding a workpiece as in claim 1, wherein said clamping fixture is slidable on said work surface along said first plane.

3. The device for holding a workpiece as in claim 1, wherein said column structure comprises two columns, said base block having two adjacent openings for accepting said two columns.

4. The device for holding a workpiece as in claim 3, wherein each said two columns are pivotally attached to said clamping block for independent raising or lowering of each of said two columns.

5. A method of preparing a cylinder head for machining utilizing a clamping fixture having a first and a second support structure for suspending the cylinder head therebetween, the method comprising the steps of:

attaching a fastening device having a first arbor and a second arbor to a first and a second end of said cylinder head;

placing a first spherical collet on said first arbor and a second spherical collet on said second arbor;

positioning the first spherical collet in a first spherical arbor opening of the first support structure and placing the second spherical collet in a second spherical arbor opening of the second support structure;

rotating said fastening device with said cylinder head therebetween to a desired rotational angle; and applying a clamping pressure to the first and second spherical collets to contract the first and second spherical collets around the first and the second arbors thereby holding said cylinder head at said desired rotational angle.

6. The device for holding a workpiece as in claim 1, further comprising a plate for applying pressure to contract said spring collet.

7. The device for holding a workpiece as in claim 1, wherein said plate is raised and lowered using pneumatic means.

8. The device for holding a workpiece as in claim 1, wherein said plate is raised and lowered using mechanical means.

9. The device for holding a workpiece as in claim 1, wherein said clamping block comprises an upper block mateable to a lower block, said upper block having a first recessed area and said lower block having a second recessed area, wherein said first and second recessed areas combine to form said arbor opening.

10. The device for holding a workpiece as in claim 9, wherein said locking means locks said upper block to said lower block and said first and second arbor therebetween.

11. The device for holding a workpiece as in claim 10, wherein said recessed area is substantially spherical, and further comprising:

a spherical collet disposed on said arbor for seating in said arbor opening, said spherical collet being contractable around said arbor.

12. The device for holding a workpiece as in claim 1, wherein said column locking means of said first support base operates in conjunction with said column locking means of said second support base.

13. The device for holding a workpiece as in claim 1, further comprising a manual lock for locking said column structure.

14. The device for holding a workpiece as in claim 1, wherein said means for adjusting a height comprises an upward bias means.

15. The device for holding a workpiece as in claim 14, wherein said upward bias means is a gas strut.

16. The device for holding a workpiece as in claim 14, wherein said upward bias means is pneumatic.

17. The device for holding a workpiece as in claim 14, wherein said upward bias means is mechanical.

18. The device for holding a workpiece as in claim 14, wherein said means for adjusting a height comprises a downward pressure applied to said workpiece to overcome said upward bias means.

19. The device for holding a workpiece as in claim 1, wherein said means for adjusting a height comprises a mechanical gear structure.

20. The device for holding a workpiece as in claim 1, wherein said means for adjusting a height comprises a pneumatic assembly for producing a downward bias.

21. An apparatus for holding a cylinder head on a work surface, said apparatus comprising:

a pallet fixture comprising:

a first fastening device for attaching to a first end of said cylinder head, said first fastening device having a first arbor; and a second fastening device for attaching to a second end of said cylinder head, said second fastening device having a second arbor;

a support structure having a first and a second support movable on said work surface for suspending said cylinder head therebetween, said first and second supports having attachment means for attaching to said work surface, each of said first and second supports comprising:

a base having a top surface and a bottom surface, said base comprising:

a first bore and a second bore extending vertically through said base;

a first and second column slidably disposed within said first and second bores;

a first spring collet assembly and a second spring collet assembly concentric with said first and second bores and adjacent said top surface, said first and second spring collets being adapted to lock said first and second columns relative to said base;

a pillow block having bores therethrough for attachment to an upper portion of each of said first and second columns, said pillow block comprising:

an upper block having a first recessed area;

a lower block hingedly attached and mateable to said upper block, said lower block having a second recessed area, wherein a combination of the first and second recessed areas forms a generally spherical opening; and a locking mechanism for locking said upper block to said lower block; and upward bias means for lifting said first and second columns and said attached pillow block; and a substantially spherical spring collet for seating in said generally spherical opening, said spherical spring collet having an arbor bore formed therethrough adapted for receiving one of said first or second arbors, said sperical spring collet being adapted to radially contract when said upper and lower blocks are mated.

22. The method of preparing a cylinder head for machining as in claim 5, wherein each said support structures comprises a plurality of vertically moveable columns supporting a clamping block, the clamping block having said spherical arbor opening for holding said spherical collet, further comprising the steps of:

applying an upward bias on the clamping block to raise the clamping block and vertically moveable columns, applying downward pressure greater than the upward bias on at least one portion of said cylinder head to lower said at least one portion and at least one column of said plurality of vertically movable columns adjacent to said at least one portion to a desired height;

applying a locking means to said plurality of moveable columns to maintain said desired height.

23. A device for holding a cylinder head on a work surface, said device comprising;

a fastening device attachable to a first end and a second end of said cylinder head, said fastening device having a first arbor adjacent said first end and a second arbor adjacent said second end;

a clamping fixture attachable to said work surface, said clamping fixture comprising a first support base and a second support base for suspending said fastening device and cylinder head therebetween, each of said first and second support bases comprising:

a base block for attachment to the work surface;

a column structure comprising a first column and a second column slidably disposed in said base block, said first column adjustable to a first desired height and said second column adjustable to a second desired height with respect to the work surface;

column locking means for locking said first and second columns at the first and second desired heights;

a clamping block pivotally attached at a first pivot point on the first column and a second pivot point on the second column, said clamping block having an arbor opening for accepting one of said first and second arbors; and a locking means for locking one of said first and second arbors at a desired rotated position;

wherein the first and second desired heights are chosen to provide a sideways tilt of the cylinder head.

24. A clamping fixture attachable to a work surface for holding a cylinder head, said clamping fixture comprising:

a fastening device comprising a first arbor attachable to a first end the cylinder head and a second arbor attachable to a second end of the cylinder head;

a first spherical collet disposed on said first arbor and a second spherical collet disposed on said second arbor, said first and second spherical collets contractable for gripping said first and second arbors;

a first support base and a second support base, each of said first and second support bases comprising:

a base block having at least one opening;

a column structure comprising at least one column slidably disposed in said at least one opening;

column locking means for locking said at least one column at a desired position in said at least one opening;

a clamping block attached to said column structure, said clamping block having an upper block mateable to a lower block, said upper block having a first recessed area and said lower block having a second recessed area, wherein said first and second recessed areas form a substantially spherical arbor opening for accepting said first or second spherical collet;

an arbor locking means for locking said upper block to said lower block, said arbor locking means providing an inward pressure for contracting said first or second spherical collet to secure said first or second arbor at a rotational position; and height adjusting means for raising and lowering said clamping block and said column structure relative to said base block.

25. The clamping fixture as in claim 24, wherein said column locking means comprises a spring collet disposed around said at least one column, said spring collet adapted to contract around said at least one column when an inward pressure is applied to the spring collet.

26. The clamping fixture as in claim 25, wherein said at least one opening in said base block is shaped to accept said contracted spring collet, the clamping fixture further comprising a pressure plate for pushing said spring collet into said at least one opening to contract said spring collet.

27. The clamping fixture as in claim 26, wherein said pressure plate is lowered onto said spring collet to push said spring collet into said at least one opening and raised to release said spring collet using a pneumatic force.

28. The clamping fixture as in claim 24, wherein said height adjusting means further comprises:

an upward bias device for providing a constant upward pressure on the clamping block and the at least one column;

and wherein the desired position of the at least one column is attained by applying an opposing downward pressure to the clamping block to move the at least one column downward, and locking the at least one column in the desired position utilizing the locking means.

29. The clamping fixture as in claim 28, wherein said upward bias device is a gas strut.

30. A device for holding a cylinder head on a work surface, the device comprising:

a fastening device for attaching to the cylinder head, the fastening device having a first arbor adjacent a first end of the cylinder head and a second arbor adjacent a second end of the cylinder head; and a clamping fixture attachable to the work surface, the clamping fixture comprising a first support base and second support base for holding the fastening device with the attached cylinder head therebetween, each of the first and second support bases comprising:

a base block for attachment to the work surface;

at least one column slidably disposed in the base block for vertical adjustment of the at least one column;

column locking means for locking the at least one column at a desired vertical position;

a clamping block attached to the column structure, the clamping block having an arbor opening for accepting one of the first or second arbors of the fastening device, the arbor opening allowing full rotation of the fastening device;

a locking means for locking the fastening device at a rotational position; and an upward bias means for maintaining an upward force on the clamping block and the at least one column relative to the base, wherein the at least one column is positioned at the desired vertical position by applying a downward force on the clamping block and locking the at least one column.

31. The device for holding a cylinder head as in claim 30, wherein the arbor opening is substantially spherical for accepting a spherical collet, the device further comprising a pair of spherical collets placed around each of the first and second arbors, each spherical collet adapted to contract and hold one of the first and second arbors at the desired rotational position when the locking means exerts an inward pressure on the spherical collet.

32. The device for holding a cylinder head as in claim 30, wherein the column locking means comprises a spring collet disposed in the base block, the at least one column slidable through the spring collet, the spring collet having means for contracting around the at least one column for locking the column at a desired height with respect to the base block.

* * * * *